United States Patent [19]

Ying et al.

[11] 4,368,399
[45] Jan. 11, 1983

[54] ROTOR END TURN WINDING AND SUPPORT STRUCTURE

[75] Inventors: Sui-Chun Ying, Monroeville; Donald C. Litz, Murrysville Boro, both of Pa.

[73] Assignee: Westinghouse Electric Corp., Pittsburgh, Pa.

[21] Appl. No.: 293,821

[22] Filed: Aug. 17, 1981

[51] Int. Cl.³ .............................................. H02K 3/46
[52] U.S. Cl. ..................................... 310/270; 310/45; 310/214; 310/260; 336/197
[58] Field of Search ............... 310/270, 260, 261, 262, 310/264, 265, 213, 208, 214, 216, 218, 201, 195, 179, 10, 43, 45, 52, 58, 61, 64, 65, 91; 336/197

[56] References Cited

U.S. PATENT DOCUMENTS

| | | | |
|---|---|---|---|
| 744,012 | 11/1903 | Knape | 310/208 |
| 894,144 | 7/1908 | Hissink | 310/270 |
| 2,103,795 | 12/1937 | Rose | 310/262 |
| 2,135,315 | 11/1938 | Walters | 310/208 |
| 3,427,488 | 2/1969 | Terry | 310/270 |
| 4,275,324 | 6/1981 | Flick | 310/270 |
| 4,278,906 | 7/1981 | Kullmann | 310/261 |

FOREIGN PATENT DOCUMENTS 581550  11/1977  U.S.S.R. .............................. 310/270

*Primary Examiner*—R. Skudy
*Attorney, Agent, or Firm*—William D. Lanyi

[57] ABSTRACT

A rotor end turn winding and support system is disclosed which provides support in the radial, axial and circumferential directions for the end turns of a superconducting rotor field coil. The end turn conductor stack is tilted from a purely radial position to facilitate the winding of the small, flexible conductors of a superconducting rotor.

17 Claims, 4 Drawing Figures

ROTOR END TURN WINDING AND SUPPORT STRUCTURE

BACKGROUND AND SUMMARY OF THE INVENTION

The present invention relates to field coils of dynamoelectric machine rotors and, more particularly, to the end turn section of a rotor field coil of a superconducting electrical generator.

Generator rotor coils which are not superconducting are subjected to centrifugal forces due to the rapid rotation of the rotor during operation. In typical designs, these forces are compensated for by a retaining ring which is securely fastened around the radially outward surface of the end turn section of the rotor coil. In conventional generators, the rotor winding is not subjected to significant forces in either the axial or circumferential directions.

Rotor coils of a superconducting generator, in contrast to the coils of the conventional nonsuperconducting rotor described above, experience substantial axial and circumferential forces due primarily to the fact that a stator of a typical superconducting generator does not utilize a laminated core to contain its stator coils. The resulting flux paths, therefore, do not pass through the teeth of a stator coil. Instead they are directed in such a way as to exert significant forces on the rotor coil in varied directions.

For these reasons, the end turn section of a superconducting rotor's field winding requires rigid support in the axial and circumferential directions besides the normal radial support requirements due to the centrifugal forces described above. If the coils are not rigidly constrained, the axial and circumferential forces described above will cause the coils to move and experience a temperature rise caused both by frictional effects and the work performed during this motion. Any creation of heat within the rotor coils will have a deleterious effect on the cryostability of a superconducting rotor and must therefore be avoided.

Another significant difference between conventional and superconducting rotor coil support requirements is that a superconducting rotor coil utilizes a conductor which is more flexible and of a smaller cross-sectional area than the larger, more rigid rotor coil of a conventional generator. The smaller, flexible conductor is more difficult to wind because of its tendency to migrate from its desired physical position during the rotor winding operation.

It should therefore be apparent that the smaller, flexible conductor of superconducting rotors, which are subjected to multidirectional forces during operation, require a winding configuration and technique to compensate for these physical conditions which are significantly different than those customary in conventional rotor field coils.

The present invention provides physical support in the radial, circumferential and axial directions to prevent the above-described forces from causing motion in the rotor coils during operation. Furthermore, an end turn winding made in accordance with the present invention is tilted from a directly radial configuration in order to facilitate its construction during the winding operation.

The rotor conductors are associated in a conductor stack that is supported by an arcuate support block that has a generally L-shaped cross-section. The conductor stack is electrically insulated from the support block by a plurality of arcuate insulative members with wedge-shaped cross-sections. A rigid end turn cylinder is placed radially outward from the support block and conductor stack with a rigid retaining tube disposed radially outward from the end turn cylinder.

The above-described configuration provides substantial coil support in all directions while permitting the conductor stack to be wound in a tilted, as opposed to radial, configuration.

BRIEF DESCRIPTION OF THE DRAWING

The present invention will be better understood from a reading of the following description of the preferred embodiment in conjunction with the figures, in which.

DESCRIPTION OF THE PREFERRED EMBODIMENT

Figure 1:
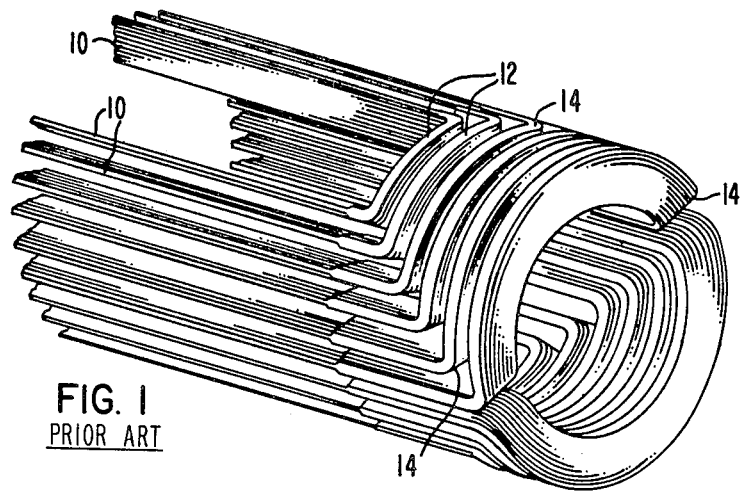
FIG. 1 depicts an exemplary rotor coil configuration of a conventional generator.

The present invention can best be understood from a preliminary discussion of the rotor coil configuration for a conventional generator. FIG. 1 depicts the rotor coils of a typical two-pole rotor which is conventional (i.e. not superconducting). The coils comprise straight sections 10 which are to be located in rotor slots (not shown) and the end turn sections 12 which are positioned axially from a slotted rotor body. Each of the two poles comprises a plurality of conductor turns. In FIG. 1 these turns are six in number for each pole. The straight section 10 of each turn extends axially for a preselected distance and is joined to an end turn section 12. The bend 14 provides a mechanical and electrical connection between the straight 10 and end turn 12 sections and provides a transition from straight conductors to arcuate conductors.

Figure 2:
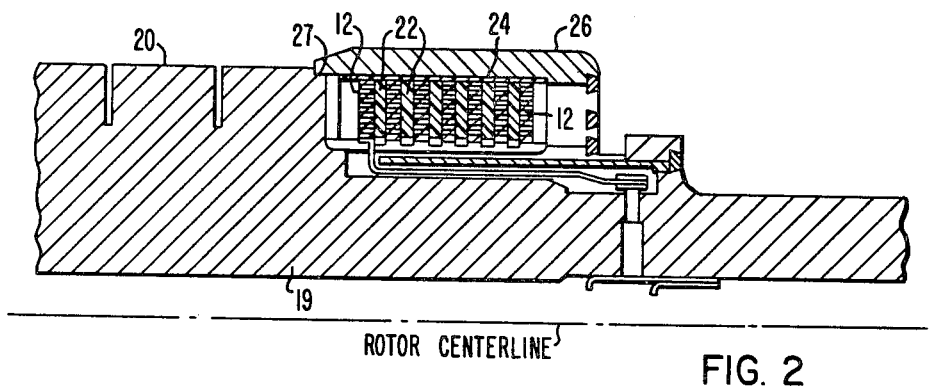
FIG. 2 is a sectional view of a conventional rotor winding, similar to that shown in FIG. 1, disposed in a conventional rotor and encased by a retaining ring.

Referring to the sectional view shown in FIG. 2, the end turn conductors 12 are shown positioned radially outward from the rotor extension 19 and axially outboard from the main rotor body 20. The end turns 12 comprise a plurality of conductors associated in a columnar structure. These columns are perpendicular to the centerline of the rotor and are separated by insulative blocks 22. An insulative cylinder 24 is disposed around the columns 12 and a retaining ring 26 provides radially inward support which prevents distortion of the coils 12 due to centrifugal forces during rotation of the rotor.

It should be apparent from FIG. 2 that the end turn columns 12 are being supported only in a radially inward direction by the retaining ring 26 and that the insulative blocks 22 serve primarily as spacers, providing no substantial axial or circumferential support. This minimal support is sufficient in conventional rotors because of the lack of axial or circumferential forces on the coil end turns 12.

Figure 3:
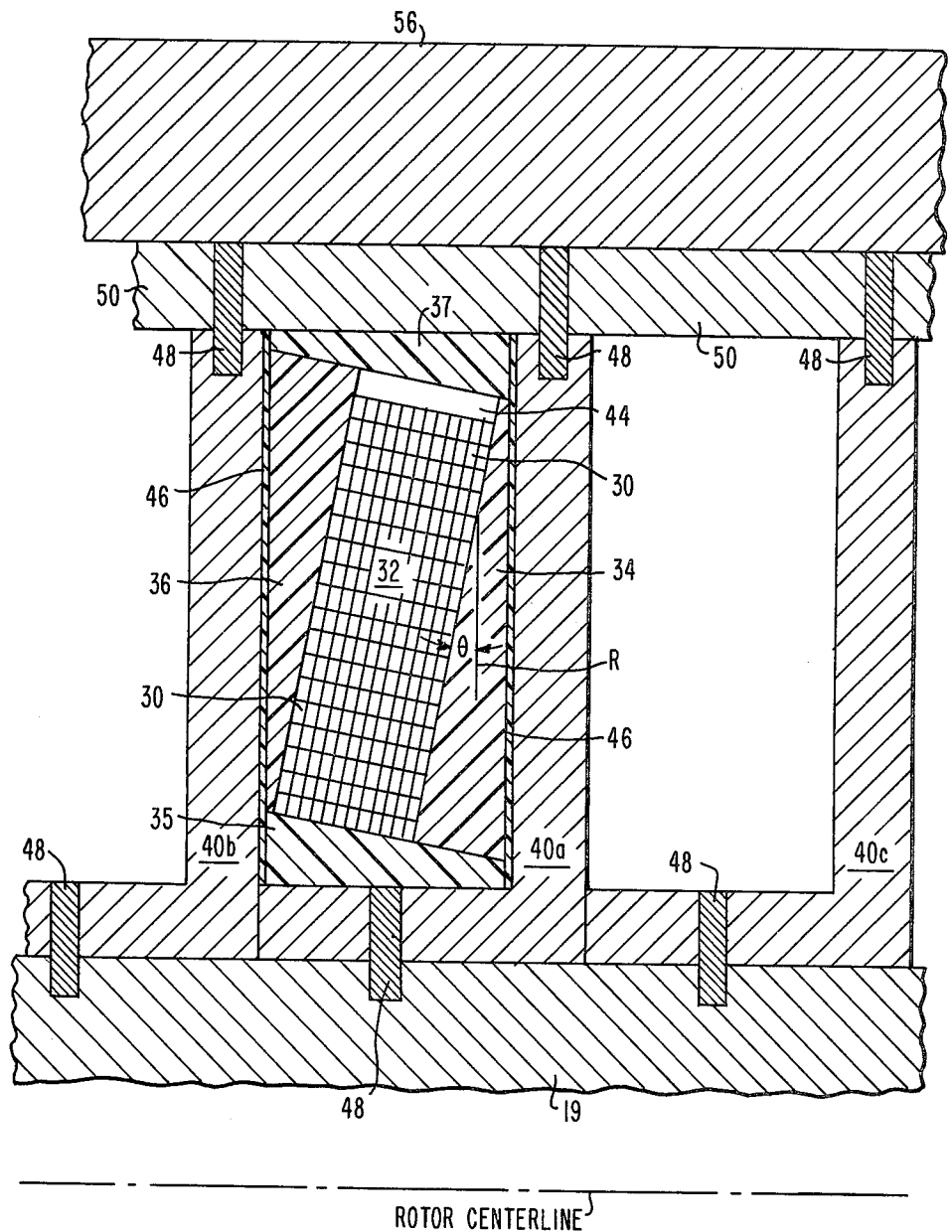
FIG. 3 illustrates a conductor stack and associated support apparatus made in accordance with the present invention.

FIG. 3 illustrates a sectional view of a rotor end turn and support system constructed in accordance with the present invention. A plurality of conductors 30 are associated in stacks. In FIG. 3, eighteen of these conductors 30 are positioned in each stack but it should be understood that variations of this number can be accommodated within the scope of the present invention. A plurality of stacks are associated in a conductor coil 32. As shown, twelve stacks are so associated but the present invention is not limited to this specific number. In this example, therefore, two hundred and sixteen of these conductors 30 are grouped into one conductor coil 32 which forms a single end turn of a rotor field winding. It should be noted that the conductor coil 32 of FIG. 3 can be distinguished from the conventional end turn 12 of FIGS. 1 and 2 by the fact that the present invention comprises a plurality of conductor stacks of relatively small, flexible conductors 30 whereas a conventional end turn 12 is a single column of larger, more rigid conductors.

Adjacent to four sides of the conductor coil 32 are insulative blocks 34, 35, 36 and 37. These blocks are arcuately shaped with wedge-shaped cross-sections as shown in the sectional view of FIG. 3. The four insulative blocks, 34 to 37, and the conductor coil 32 are supported by an arcuate support block 40a which has a generally L-shaped cross-section. Two other support blocks, 40b and 40c, are shown in FIG. 3 which similarly support other conductive coils (not shown). As shown in FIG. 3, the arcuate support block 40a has an axially extending leg, which extends along the rotor extension 19 in a direction which is generally parallel to the rotor centerline, and a radially extending leg which is generally perpendicular to both the axially extending leg and the rotor centerline. It should be apparent that the insulative blocks, 34 to 37, provide electrical insulation between the conductor coil 32, the adjacent support blocks 40a and 40b and the end turn cylinder 50.

The cross-sectional shape of these four insulative blocks is chosen to result in a conductor end turn 32 position which is tilted by a preselected angle, $\theta$, from a line R which is perpendicular to the centerline of the rotor. The dimensions of the insulative blocks, 34 to 37, are also chosen to provide for a space 44 in which electrical connections between conductor stacks can be made. The insulative spacer blocks (not shown in FIG. 3) are shaped to fill the space between the conductor coil 32 and the insulative block 37 in the regions of space 44 where no electrical connections are located. The purpose of the insulative spacer blocks is to prevent the conductors 30 from migrating into the space 44 during operation of the rotor. It should be understood that, if the electrical connections are not made within the space 44, no space 44 would be required and therefore no insulative spacer blocks would be needed to fill the space between the connections.

Since the conductor coil 32 is constructed one stack at a time, it has been found that the conductors 30 of a wound stack tend to migrate out of position at the end turn during the subsequent winding of other stacks if the conductor coil 32 is constructed perpendicular to the centerline of the rotor (i.e. angle $\theta$ = zero). However, with an angle, $\theta$, of a few degrees, the end turn conductors 30 remain in position during assembly and the winding operation is considerably facilitated. It has been determined that an angle $\theta$ of approximately five to ten degrees provides a sufficient tilt of the stacks of the conductor coil 32 to prevent conductor migration during the winding operation and to be a geometrically efficient use of the available space. On each axial side of the insulative block assembly, an insulative sheet 46 provides additional insulation to prevent electrical communication between the coil end turn and the support blocks 40 and 41 through the coplanar interfaces between adjacent insulation blocks.

An end turn cylinder 50 is positioned around the above-described assembly of support blocks (e.g. 40a, 40b and 40c), conductor coils 32 and insulative blocks (e.g. 34 to 37). This cylinder 50 can be made in a single piece or, preferably, of two or more arcuate sections. In order to prevent motion of the above-described assembly relative to the rotor, pins 48 are applied to fasten the support blocks (reference numerals 40, 40b and 40c) to the rotor and the end turn cylinder 50 to the support blocks. The pins 48 rigidly connect the axially extending leg of the support block to the rotor extension 19 and the radially extending leg of the support block to the end turn cylinder. The pins 48, support blocks and end turn cylinder 50 should be made of either the same material or materials which have similar moduli and thermal coefficients of thermal expansion in order to equalize the effects of temperature and forces on these components.

Referring again to FIG. 2, it should be apparent that the retaining ring 26 of a conventional rotor is typically shrunk onto the rotor body 20 only at its nose portion on the pole head 27. When the rotor is in operation, its rotation produces centrifugal forces which cause the retaining ring 26 to expand in a radially outward direction along its portion which lies outboard from this point 27. The retaining ring 26 moves radially in and out due to speed fluctuations along with the end turns 12 around which it is disposed. This movement, as described above, is very undesirable in a superconducting rotor.

Figure 4:
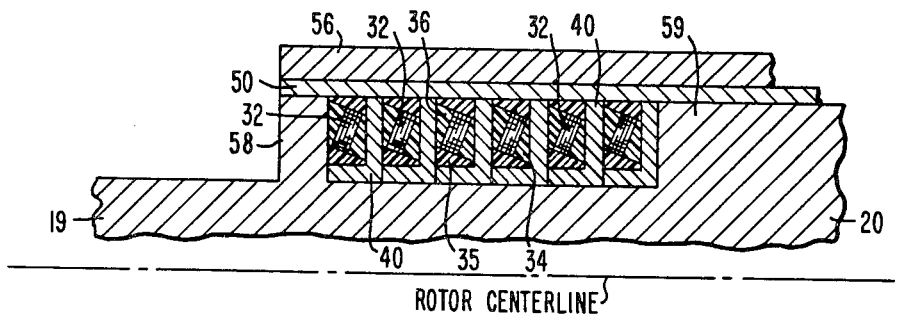
FIG. 4 shows a plurality of rotor conductor stacks and support apparatus made in accordance with the present invention and assembled in a superconducting rotor.

FIGS. 3 and 4 show the distinction between the retaining tube 56 of the present invention and the conventional retaining ring described above. The retaining tube 56 is shrunk onto the rotor and coil assembly along its entire length. This shrink fit extends axially along the pole head, support blocks and flange portion (reference numeral 58 in FIG. 4). The fact that the entire retaining tube 56 is subjected to a shrink fit prevents its movement during operational speeds of rotation and thereby virtually eliminates any possible motion of the end turn assembly.

It should be understood that, although FIG. 3 shows only one conductor coil and insulative block assembly in detail located adjacent to support block 40, each support block (i.e. 40a, 40b, 40c, etc) is associated with assemblies which are similar to the one shown except in dimensions that relate to their different axial positions on the rotor 19.

FIG. 4 shows a sectional view of a rotor body 20 and extension 19 with a field coil end turn assembly constructed in accordance with the present invention. Typically, the end turn assembly is located between a flange portion 58 and a pole head portion 59 of the rotor body 20 which, together form an annular cavity. In this cavity, the support blocks 40, insulative blocks (reference numerals 34 to 37) and conductor coils 32 are contained. It should be understood that, in FIG. 4, reference numeral 32 is used to designate a conductor coil which comprises a plurality of conductors 30 which are illustrated in detail in FIG. 3. FIG. 4 also shows the end turn cylinder 50 and retaining tube 56 positioned radially outward from the end turn assembly and shrunk onto the rotor and coil assembly along its entire length.

The differences between the present invention and the end turn construction of conventional rotors can be more clearly realized by comparing the conventional design shown in FIG. 2 to the present invention shown in FIG. 4. It should be apparent that the arcuate end turn conductor coil 32 is tilted at a preselected angle from a radial position while the conventional conductor column 12 extends radially from the rotor. Also the present invention provides axial and circumferential support for the conductor end turn with support block 40a and insulative blocks 34 to 37 while this type of support is not required in conventional rotors. For radially inward support, the conventional rotor utilizes a retaining ring 26 in combination with an insulative tube 24 while the present invention uses an end turn cylinder 50 and a retaining tube 56 with the insulative block 37 providing electrical insulation between the conductor coil end turns 32 and the end turn cylinder 50.

It should further be apparent to those skilled in the art that the present invention provides a rotor end turn assembly and support system that supports the end turn conductors in all directions and facilitates the manufacture of the rotor coils during the winding operation. It should further be apparent that, although the present invention has been described in considerable detail, it should not be considered to be so limited.

What we claim is:
1. A dynamoelectric machine rotor, comprising:
   a field winding comprising a straight portion and an end turn portion, said straight portion being disposed in axial slots machined in said rotor, said end turn portion extending axially from said slots;
   said end turn portion comprising a plurality of coils, each of said coils comprising a plurality of conductor stacks, each of said stacks comprising a plurality of conductors, each of said stacks extending radially from said rotor at a preselected angle from a plane which is perpendicular to the centerline of said rotor;
   a plurality of arcuate support blocks, each of said support blocks having a generally L-shaped cross-section comprising an axial and a radial leg, said coil stack being disposed radially adjacent to said axially extending leg and axially adjacent to said radially extending leg;
   insulative means for preventing electrical communication between said conductor coil and said support block;
   an end turn cylinder disposed radially outward from said conductor coils and said support blocks; and
   a retaining tube disposed radially outward from said end turn cylinder.
2. The rotor of claim 1, wherein:
   said end turn cylinder comprises a plurality of arcuate sections.
3. The rotor of claim 1, wherein:
   said insulative means comprises a plurality of arcuate insulative members, each of which has a generally wedge shaped cross-section.
4. The rotor of claim 3, further comprising:
   an insulative sheet disposed between said arcuate insulative members and said support blocks.
5. The rotor of claim 1, further comprising:
   at least one pin extending radially through said end turn cylinder and into said support block and at least one pin extending radially through said support block into said rotor.
6. The rotor of claim 1, wherein:
   said insulative means is disposed proximate said conductor coil with sufficient space between said insulative means and said conductor coil to permit electrical connections to be made between conductor columns of the same conductor coil.
7. The rotor of claim 6, further comprising:
   insulative spacer blocks disposed proximate said electrical connection, said insulative spacer blocks being disposed within said space between said insulative means and said conductor coil.
8. The rotor of claim 1, wherein:
   said support block and said end turn cylinder are made of the same material.
9. The rotor of claim 1, wherein:
   said preselected angle is between five and ten degrees.
10. The rotor of claim 1, wherein:
    said retaining tube is disposed about said rotor and said end turn assembly with a shrink fit substantially along its entire length.
11. A superconducting rotor with an end turn assembly, comprising:
    a plurality of conductive strands positioned to form a conductive stack, said stack extending radially outward from said rotor and axially inward from a plane which is perpendicular to the axis of rotation of said rotor, said stack being disposed adjacent another stack which is similarly constructed, a plurality of said stacks being associated in a conductive coil;
    an arcuate support block with a generally L-shaped cross-section having an axially extending leg and a radially extending leg, said conductive stack being positioned radially adjacent to said axially extending leg and axially adjacent to said radially extending leg;
    means for electrically insulating said conductive stack from said support block;
    an end turn cylinder disposed radially outward from said support block; and
    a retaining tube disposed radially outward from said end turn cylinder.
12. The rotor of claim 11, wherein:
    said end turn cylinder comprises a plurality of arcuate segments.
13. The rotor of claim 11, wherein:
    said electrical insulating means comprises a plurality of arcuate members with wedge shaped cross-sections.
14. The rotor of claim 11, wherein:
    said electrical insulating means is spaced away from said conductive stack to create a space between said conductive coil and said insulating means for an interstack electrical connection.
15. The rotor of claim 11, wherein:
    said retaining tube is shrunk onto said end turn cylinder and said rotor along substantially the entire length of said retaining tube.
16. The rotor of claim 11, wherein:
    said stack extends inward from said plane which is perpendicular to the axis of rotation at an angle from said plane which is between five and ten degrees.
17. A dynamoelectric machine rotor with an end turn assembly, comprising:

a plurality of conductive strands positioned to form a conductor stack, said stack extending radially outward from said rotor and axially inward at an angle which is between five and ten degrees from a plane which is perpendicular to the axis of rotation of said rotor, said stack being disposed adjacent another stack which is similarly constructed, a plurality of stacks being associated in a conductor coil;

means for supporting said conductor stacks at said angle, said supporting means providing electrical insulation between said conductor stacks and said rotor; and means for preventing said conductor stack from moving away from said rotor.

* * * * *